US007332546B2

(12) United States Patent
Fansler et al.

(10) Patent No.: US 7,332,546 B2
(45) Date of Patent: *Feb. 19, 2008

(54) RING-OPENED AZLACTONE TELECHELIC POLYMER

(75) Inventors: Duane D. Fansler, Dresser, WI (US); Kevin M. Lewandowski, Inver Grove Heights, MN (US); Babu N. Gaddam, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 148 days.

This patent is subject to a terminal disclaimer.

(21) Appl. No.: 10/956,841

(22) Filed: Oct. 1, 2004

(65) Prior Publication Data

US 2006/0074211 A1 Apr. 6, 2006

(51) Int. Cl.
*C08F 120/10* (2006.01)
(52) U.S. Cl. .................... 525/330.3; 525/127; 525/308; 525/314; 526/147; 526/217; 526/319
(58) Field of Classification Search ............. 525/330.3, 525/308, 314, 127; 526/147, 217, 319
See application file for complete search history.

(56) References Cited

U.S. PATENT DOCUMENTS

| 2,730,517 | A | 1/1956 | Vogel et al. |
| 4,262,072 | A | 4/1981 | Wendling et al. |
| 4,408,018 | A | 10/1983 | Bartman et al. |
| 4,576,850 | A | 3/1986 | Martens |
| 4,871,822 | A | 10/1989 | Brindöpke et al. |
| 5,017,649 | A | 5/1991 | Clemens |
| 5,091,489 | A | 2/1992 | Heilmann et al. |
| 5,132,367 | A | 7/1992 | Chan |
| 5,147,957 | A | 9/1992 | Kumar |
| 5,175,072 | A | 12/1992 | Martens |
| 5,227,413 | A | 7/1993 | Mitra |
| 5,256,473 | A | 10/1993 | Kotani et al. |
| 5,281,482 | A | 1/1994 | Martens et al. |
| 5,459,178 | A | 10/1995 | Chan et al. |
| 5,466,863 | A | 11/1995 | Heidt et al. |
| 5,506,279 | A | 4/1996 | Babu et al. |
| 5,539,017 | A | 7/1996 | Rheinberger et al. |
| 5,902,836 | A | 5/1999 | Bennett et al. |
| 6,025,410 | A | 2/2000 | Moy et al. |
| 6,204,343 | B1 | 3/2001 | Barucha et al. |
| 6,245,922 | B1 | 6/2001 | Heilmann et al. |
| 6,635,690 | B2 * | 10/2003 | Heilmann et al. .......... 522/111 |
| 6,677,402 | B2 | 1/2004 | Gaddam et al. |
| 7,015,286 | B2 * | 3/2006 | Heilmann et al. .......... 525/191 |
| 2003/0096908 | A1 * | 5/2003 | Heilmann et al. ............ 525/63 |
| 2003/0134930 | A1 | 7/2003 | Gaddam et al. |
| 2005/0081994 | A1 | 4/2005 | Beckley et al. |

FOREIGN PATENT DOCUMENTS

EP 0 227 454 A2 7/1987

| EP | 0 376 460 A1 | 7/1990 |
| EP | 0 473 457 A2 | 3/1992 |
| GB | 2 335 424 A | 9/1999 |
| WO | WO 95/16749 | 6/1995 |
| WO | WO 97/05101 | 2/1997 |
| WO | WO 9705101 A1 * | 2/1997 |
| WO | WO 99/38034 | 7/1999 |

OTHER PUBLICATIONS

G. B. Fields et al., "Solid Phase Peptide Synthesis Utilizing 9-fluorenylmethoxycarbonyl Amino Acids", International Journal of Peptide & Protein Research, (1990), pp. 161-214, vol. 35.
G. B. Fields et al., Chapter 3, "Principles and Practice of Solid-Phase Peptide Synthesis", Synthetic Peptides: A User's Guide, G. A. Grant Edition, (1992), pp. 77-183, W. H. Freeman and Co., New York, NY.
J. S. Witzeman et al., "Transacetoacetylation with tert-Butyl Acetoacetate: Synthetic Applications", Journal of Organic Chemistry, (1991), pp. 1713-1718, vol. 56, American Chemical Society.
N. Moszner et al., "Reaction Behaviour of Monomeric β-ketoesters, $4^{a)}$, Polymer Network Formation by Michael Reaction of Multifunctional Acetoacetates with Multifunctional Acrylates", Macromol. Rapid Commun., (1995), pp. 135-138, vol. 16.
F. D. Rector et al., "Synthesis of Acetoacetylated Resins and Applications for Acetoacetate Chemistry in Thermoset Coatings", Surface Coatings Australia, (Sep. 1989), pp. 6-15.
F. D. Rector et al., "Applications for the Acetoacetyl Functionality in Thermoset Coatings", Proceedings of the Fifteenth Water-Borne and Higher-Solids Coatings Symposium, (Feb. 3-5, 1988), pp. 68-103, Department of Polymer Science University of Southern Mississippi and Southern Society for Coatings Technology.
D. L. Trumbo, "Michael Addition Polymers from 1,4 and 1,3 benzenedimethanol diacetoacetates and tripropylene glycol diacrylate", Polymer Bulletin, (1991), pp. 265-270, vol. 26.
D. L. Trumbo, "Michael Addition Polymers from Bisacetoacetates, II. 2,2-dimethyl-1,3-bis(acetoacetyl)-propanediol and N,N'-bis(acetoacetyl)-1,4-piperazine", Polymer Bulletin, (1991), pp. 481-485, vol. 26.
R. J. Clemens et al., "A Comparison of Catalysts for Crosslinking Acetoacetylated Resins via the Michael Reaction", Journal of Coatings Technology, (Mar. 1989), pp. 83-91, vol. 61, No. 770.
F. D. Rector et al., "Applications for Acetoacetyl Chemistry in Thermoset Coatings", Journal of Coatings Technology, (Apr. 1989), pp. 31-37, vol. 61, No. 771.
T. Li et al., "Use of Formic Acid in Controlling the Rate of the Michael Addition Reaction in Base Catalyzed, Thermally Cured Acetoacetylated Acrylic/TMPTA Coatings", Journal of Coatings Technology, (Jun. 1993), pp. 63-69, vol. 65, No. 821.
U.S. Appl. No. 11/009,181, filed Dec. 10, 2004, entitled "Polymerizable Compositions, Methods of Making the Same, and Composite Articles Therefrom".

(Continued)

*Primary Examiner*—David W. Wu
*Assistant Examiner*—Michael Bernshteyn
(74) *Attorney, Agent, or Firm*—Kent S. Kokko

(57) ABSTRACT

A curable composition is described comprising a Michael donor component, a polyacryl component, and 1) an ethylenically unsaturated monomer having a reactive azlactone functional group, or 2) an ethylenically unsaturated monomer having a reactive ring-opened azlactone functional group. A telechelic polymer that is the reaction product of these components is also described.

12 Claims, No Drawings

OTHER PUBLICATIONS

Heilmann et al., "Chemistry and Technology of 2-Alkenyl Azlactones", Journal of Polymer Science: Part A: Polymer Chemistry, (2001), pp. 3655-3677, vol. 39, John Wiley & Sons, Inc.

Drtina et al., "Highly Cross-Linked Azlactone Functional Supports of Tailorable Polarity", Macromolecules, (1996), pp. 4486-4489, vol. 29, No. 13, American Chemical Society.

* cited by examiner

RING-OPENED AZLACTONE TELECHELIC POLYMER

FIELD OF THE INVENTION

The present invention is directed to telechelic polymers having azlactone or ring-opened azlactone terminal groups.

BACKGROUND

The chemistry of acetoacetate compounds, and the Michael addition to acrylates has been described. For example, Mozner and Rheinberger reported the Michael addition of acetoacetates having a β-dicarbonyl group to triacrylates and tetracrylates to form gel products. See Macromolecular Rapid Communications 16 135-138 (1995).

U.S. Pat. No. 6,025,410 notes that the stoichiometry of the Michael donor to the Michael acceptor is critical to controlling the molecular weight. The reference teaches that certain soluble liquid uncrosslinked oligomers, made by one step Michael addition of acetoacetates to multi-acrylates, can be further crosslinked using ultraviolet light without using photoinitiators. If proportions below the claimed ranges are used, crosslinked gels or solid products are made which are not useful because only un-gelled, uncrosslinked liquid oligomers will further crosslink without adding photoinitiators. The described liquid oligomer compositions, since they are liquids, can readily be applied to various substrates using conventional coating techniques such as roll or spray prior to ultraviolet light cure.

U.S. Pat. No. 5,132,367 describes NCO-free resins and cured products thereof. The cured products are obtained by a Michael reaction of an acetoacetylated (meth)acrylic resin or an acetoacetylated polyester and an NCO-free polyurethane having at least two (meth)acrylic end groups. U.S. Pat. No. 5,132,367 however does not teach the use of these products in electrical applications.

EP 227454 discloses a process for preparing a cured polymer involving the Michael reaction of an acetoacetylated polyol and a poly α,β-unsaturated ester. The obtained cured products are said to exhibit excellent adhesion, excellent solvent resistance, excellent gloss retention, good flexibility and hardness.

U.S. Pat. No. 5,459,178 describes mixtures comprising an acetoacetate ester, an α,β-ethylenically unsaturated monomer and a liquid tertiary amine catalyst. A cured system is obtained by reacting these components. The acetoacetate ester used is prepared by transesterification of polyhydroxyl compound having an average of at least two hydroxy groups with an alkylacetoacetate.

U.S. Pat. No. 4,871,822 discloses a Michael reaction of olefinically unsaturated compounds with compounds containing at least two active hydrogen atoms for 2 component lacquers. As olefinically unsaturated compounds there are considered compounds having at least two α,β-unsaturated carbonyl groups. There are a large number of Michael donors including acetoacetylated polyols or polyamines and such compounds as e.g. acetylacetone or benzoylacetone.

David L. Trumbo in Polymer Bulletin 26, pages 265-270 (1991) discloses Michael addition polymers obtained from 1,4- and 1,3-benzenedimethanol diacetoacetates and tripropylene glycol diacrylate. The reference describes that in case the reactants are used in stoichometric amounts of the reactive groups, gelation of the system is observed. In another paper (Polymer Bulletin 26, pages 481-485 (1991)) the same author described Michael addition polymers obtained from the reaction of a bis(acetoacetyl) amide or an aliphatic acetoacetate and a di-acrylate comonomer. However, no utilisation or properties of the polymers are described in these articles.

WO 95/16749 describes a water-borne curable composition that comprises an acetoacetylated polymer in the form of an aqueous solution, dispersion or emulsion and a polyacrylate that has at least two (meth)acrylate end groups. According to this publication, such composition is stable even in the presence of a catalyst until the water is evaporated from the system.

The use of acetoacetyl chemistry, in particular the use of acetoacetylated resin, in thermosetting systems is further described in Journal of Coatings Technology Vol. 61 no. 771 page 31 to 37; Journal of Coatings Technology Vol. 65 no. 821 page 63 to 69; Surface Coatings Australia, September 1989 page 6 to 15; and Journal of Coatings Technology Vol. 61 no. 770 page 83 to 91.

SUMMARY

The present invention provides a curable composition comprising a Michael donor component, a polyacryl component, and 1) an ethylenically unsaturated monomer having a reactive azlactone functional group, or 2) an ethylenically unsaturated monomer having a reactive ring-opened azlactone functional group. In another aspect, the invention provides a telechelic polymer that is the reaction product of these components.

In another aspect, the invention provides a method for preparing a telechelic polymer of controlled molecular weight by reacting a Michael donor component, a polyacryl component, and 1) an ethylenically unsaturated monomer having a reactive azlactone functional group, or 2) an ethylenically unsaturated monomer having a reactive ring-opened azlactone functional group. The invention overcomes the problems in the art by using a mono-ethylenically unsaturated monomer to regulate and control the molecular weight of the resulting polymers and to render the polymer telechelic. Thus the product polymer has at least one terminal group that may be used for further functionalization.

In some embodiments, curable compositions according to the present invention are coated on a substrate and at least partially polymerized to form a protective coating. Accordingly, in another aspect, the present invention provides a composite article comprising a substrate having thereon a coating preparable by at least partially polymerizing the curable composition.

As used herein:

"Iacryl" is used in a generic sense and mean not only derivatives of acrylic acid, but also amine, thiol and alcohol derivatives, respectively;

"alkyl" and "alkylene" mean the monovalent and divalent residues remaining after removal of one and two hydrogen atoms, respectively, from a linear or branched chain hydrocarbon having 1 to 20 carbon atoms;

"lower alkyl" means $C_1$ to $C_4$ alkyl;

"aryl" and "arylene" mean the monovalent and divalent residues remaining after removal of one and two hydrogen atoms, respectively, from an aromatic compound (single ring and multi- and fused-rings) having 5 to 12 ring atoms and includes substituted aromatics such as lower alkaryl and aralkyl, lower alkoxy, N,N-di(lower alkyl)amino, nitro, cyano, halo, and lower alkyl carboxylic ester, wherein "lower" means $C_1$ to $C_4$.

"cycloalkyl" and "cycloalkylene" mean the monovalent and divalent residues remaining after removal of one and two hydrogen atoms, respectively, from a cyclic hydrocarbon having 3 to 12 carbon atoms;

"curable" means that a coatable material can be transformed into a solid, substantially non-flowing material by means of cooling (to solidity hot melts), heating (to dry and solidify materials in a solvent), chemical cross linking, radiation crosslinking, or the like.

"(meth)acryl" includes both acryl and methacryl groups.

"polyacryl" means a compound having two or more acryl groups that may function as Michael acceptors.

DETAILED DESCRIPTION

The present invention provides a curable composition comprising a Michael donor component, a polyacryl component, and 1) an ethylenically unsaturated monomer having a reactive azlactone functional group, or 2) an ethylenically unsaturated monomer having a reactive ring-opened azlactone functional group.

A Michael donor preferably corresponds to one of formulas (I) to (III):

  (I)

  (II)

  (III)

wherein $R^1$ represents hydrogen, an alkyl group or an aryl group;

$W^1$ and $W^2$ each independently selected from a cyano group, a nitro group, an alkyl carbonyl group, an alkoxy carbonyl group, an aryl carbonyl group, an aryloxy carbonyl group, an amido group, a sulphonyl group;

P represents a mono- or multi-valent organic residue, or the reaction residue of a polyol or polyamine in an acetoacetylation reaction, and x represents an integer of 1 or more when $R^1$ is hydrogen, and x is two or more when $R^1$ represents an alkyl group or an aryl group. Thus the number of donor group equivalents for each of the compounds of Formulas I, II and III is two or greater.

One useful class of Michael donors according to formula (I) are acetoacetylated polyols, which may be represented by Formula I where P is the residue of a polyol. The acetoacetylated polyol can be prepared by transesterification with an alkyl acetoacetate. A preferred transesterification reagent for this purpose is tert-butyl acetoacetate described by J. S. Witzeman and W. D. Nottingham in J. Org. Chem., 1991, (56), pp. 1713-1718. The polyols being acetoacetylated in this invention preferably have two or more hydroxy groups. The conversion of hydroxy groups to acetoacetate groups should be between 80 mol % and 100 mol % and more preferably between 85 mol % and 100 %. Suitable acetoacetylated polyols are, for example, those obtained from one of the following polyols: polyethylene glycol, polypropylene glycol, polybutylene glycol, pentaerythritol, trimethylolethane, trimethylol propane, bis-trimethylol propane, K 55™ (available from Bayer AG) which is a condensation product of trimethylolpropane and propyleneoxide, dipentaerythritol, castor oil, glycerine, dipropyleneglycol, N,N,N'N'-tetrakis(2-hydroxypropyl)ethylendiamine, neopentylglycol, propanediol, butanediol, diethyleneglycol and the like. One or more of the hydroxyl end groups of such polyols may be acetoacetylated. In some embodiments it may be advantageous to acetoacetylate one end group, and to functionalize the other groups with an ethylenically unsaturated polymerizable group, such as an allyl group, a vinyl group or a (meth)acrylate group.

Where a hydrophilic telechelic polymer is desired, a acetoacetylated poly(alkylene oxide) may be used. The functional groups terminating the poly(alkylene oxide) may include hydroxy groups, and amine groups, which may be acetoacetylated as previously described. Poly(ethylene oxide), poly(propylene oxide), poly(ethylene oxide-propylene oxide), and combinations thereof may be acetoacetylated at one or both terminal ends.

Lower functionalised acetoacetylated polyols allow a more selective and better control of cross-linking than higher functionalised acetoacetylated polyols. Preferably, an acetoacetylated polyol in connection with this invention has an equivalent weight of less than 200 g/mol. A preferred range of equivalent weight of an acetoacetylated polyol in connection with this invention is between 30 g/mol and 5000 g/mol.

Examples of Michael donors according to formula (II) are e.g. compounds of the type p-$CH_3C_6H_4$—$SO_2NHCO_2$—P' wherein P' represents the residue of a polyol such as e.g. pentaerythritol, trimethylolpropane, 1,6-hexanediol, ditrimethylolpropane, propanediol, diethyleneglycole and the like.

Examples of compounds according to formula (III) are NC—$CH_2$—CN, $CH_3SO_2CH_2$CN, $CF_3$—C(O)—$CH_2$—C(O)—$CF_3$, $CF_3$—C(O)—$CH_2$—C(O)—$OC_2H_5$, p-$CH_3C_6H_4SO_2CH_2SO_2CH_3$, $C_6H_5$—C(O)—$CH_2$—$SO_2CH_3$, $(CH_3O_2CCH_2)_2SO_2$, p-$O_2NC_6H_4CH_2CN$, and the like. Further examples may be found in U.S. Pat. No. 5,256,473.

With respect to Formulas I, II, and III, any of P, $W^1$ or $W^2$ may be further substituted with an ethylenically unsaturated polymerizable group, such as a methacryl group, a vinyl groups or an allyl group. Where such groups are unreactive in a Michael addition, they may be subsequently free-radically polymerized, in the presence of a free radical catalyst. For example $W^1$ (or $W^2$) may be —C(O)—O—$C_nH_{2n}$—O—C(O)—C($CH_3$)=$CH_2$, —C(O)—O—$C_nH_{2n}$—O—$CH_2$—CH=$CH_2$, or —C(O)—O—$C_nH_{2n}$—O—CH=$CH_2$, where n=1-10. Similarly, P may be substituted with —C(O)—O—$C_nH_{2n}$—O—C(O)—C($CH_3$)=$CH_2$, —C(O)—O—$C_nH_{2n}$—O—$CH_2$—CH=$CH_2$, —C(O)—O—$C_nH_{2n}$—O—CH=$CH_2$, —O—$C_nH_{2n}$—O—C(O)—C($CH_3$)=$CH_2$, —O—$C_nH_{2n}$—O—$CH_2$—CH=$CH_2$, or —O—$C_nH_{2n}$—O—CH=$CH_2$, where n=1-10.

Useful Michael donors that may be further substituted with an ethylenically unsaturated polymerizable group include 2-acetoacetoxyethyl methacrylate, and allyl acetoacetate.

A particularly preferred type of Michael donor corresponding to formula (III) for use in this invention corresponds to the following formula (IV):

  (IV)

wherein $R^2$ and $R^3$; each independently represent an aryloxy group, an alkoxy group, an alkyl group or an aryl group.

A Michael donor according to formula (III) and in particular formula (IV) are preferred because they are generally less costly than e.g. an acetoacetylated polyol which requires an acetoacetylation of a polyol as described above. Moreover, this acetoacetylation involves a transesterification during which an alcohol is formed as a waste. Preferred Michael donors according to formula (IV) are those wherein $R^2$ and $R^3$; are independently selected from a alkyl such as e.g. methyl, ethyl, propyl, an aryl such as e.g. a phenyl, a alkoxy group such as e.g. a methoxy, an ethoxy, a t-butoxy or a aryloxy group such as e.g. a phenoxy group. Examples of compounds according to formula (IV) are acetylacetone, methylacetoacetate, ethylacetoacetate, methyl malonate, ethyl malonate, t-butyl acetoacetate, and the like.

Useful polyacryl compounds include those of the general formula:

$$R^4-(Z-C(O)-CH=CH_2)_z \quad (V)$$

wherein each Z independently represents —S—, —O—, —NH—, or —$NR^5$—, where each $R^5$ independently represents H, an alkyl group having from 1 to 6 carbon atoms;

Each $R^4$ independently represents a polyvalent organic group having a valence of z, which can be cyclic, branched, or linear, aliphatic, aromatic, or heterocyclic, having carbon, hydrogen, nitrogen, nonperoxidic oxygen, sulfur, or phosphorus atoms;

each z independently represents an integer greater than or equal to 2.

In one embodiment, $R^4$ may be a polyvalent organic group having a valence of at least 3. Examples of polyvalent groups $R^4$ include 2,2-bis(ylomethyl)butan-1-yl; ethylene; 2,2-bis(ylomethyl)-propan-1,3-diyl; and 2,2,6,6-tetrakis (ylomethyl)-4-oxaheptan-1,7-diyl; butan-1,3-diyl; hexane-1,6-diyl; and 1,4-bis(ylomethyl)cyclohexane. Further details regarding the $R^4$ groups may be had with reference to the following useful polyacyl compounds.

Useful polyacryl compounds include, for example, acrylate monomers selected from the group consisting of (a) diacryl containing compounds such as 1,3-butylene glycol diacrylate, 1,4-butanediol diacrylate, 1,6-hexanediol diacrylate, ethylene glycol diacrylate, alkoxylated aliphatic diacrylate, alkoxylated cyclohexane dimethanol diacrylate, alkoxylated hexanediol diacrylate, alkoxylated neopentyl glycol diacrylate, caprolactone modified neopentylglycol hydroxypivalate diacrylate, cyclohexanedimethanol diacrylate, diethylene glycol diacrylate, dipropylene glycol diacrylate, bisphenol-A diacrylate, ethoxylated bisphenol-A diacrylate, hydroxypivalaldehyde modified trimethylolpropane diacrylate, neopentyl glycol diacrylate, polyethylene glycol diacrylate, propoxylated neopentyl glycol diacrylate, tetraethylene glycol diacrylate, tricyclodecanedimethanol diacrylate, triethylene glycol diacrylate, tripropylene glycol diacrylate; (b) triacryl containing compounds such as glycerol triacrylate, ethoxylated triacrylates (e.g., ethoxylated trimethylolpropane triacrylate, pentaerythritol triacrylate, propoxylated triacrylates (e.g., propoxylated glyceryl triacrylate, propoxylated trimethylolpropane triacrylate, tris(2-hydroxyethyl)isocyanurate triacrylate; (c) higher functionality acryl-containing compounds such as ditrimethylolpropane tetraacrylate, dipentaerythritol pentaacrylate, ethoxylated pentaerythritol tetraacrylate, pentaerythritol tetraacrylate, caprolactone modified dipentaerythritol hexaacrylate; (d) oligomeric acryl compounds such as, for example, urethane acrylates, polyester acrylates, epoxy acrylates; polyacrylamide analogues of the foregoing; and combinations thereof.

Such compounds available from vendors such as, for example, Sartomer Company, Exton, Pa.; UCB Chemicals Corporation, Smyrna, Ga.; and Aldrich Chemical Company, Milwaukee, Wis. Additional useful acrylate materials include hydantoin moiety-containing polyacrylates, for example, as described in U.S. Pat. No. 4,262,072 (Wendling et al.).

Other useful polyacryl compounds also include, for example, free-radically polymerizable acrylate oligomers and polymers having pendant (meth)acryl groups wherein at least two of the (meth)acryl groups is an acryl group.

Useful acrylate oligomers include acrylated polyether and polyester oligomers. Where a hydrophilic telechelic polymer is desired, a polyacyl poly(alkylene oxide) may be used. The functional groups terminating the poly(alkylene oxide) may include hydroxy groups, and amine groups, which may be acrylated. Poly(ethylene oxide), poly(propylene oxide), poly (ethylene oxide-propylene oxide), and combinations thereof may be acrylated at one or both terminal ends.

Useful acrylated polyether oligomers include polyethylene glycol diacrylates available, for example, under the trade designations "SR259" and "SR344" from Sartomer Company. Acrylated polyester oligomers are available, for example, under the trade designations "EBECRYL 657" and "EBECRYL 830" from UCB Chemicals Corporation.

Other useful acrylate oligomers include acrylated epoxies, for example, diacrylated esters of epoxy-functional materials (e.g., diacrylated esters of bisphenol A epoxy-functional material) and acrylated urethanes. Useful acrylated epoxies include, for example, acrylated epoxies available under the trade designations "EBECRYL 3500", "EBECRYL 3600", "EBECRYL 3700", and "EBECRYL 3720" from UCB Chemicals Corporation. Useful acrylated urethanes include, for example, acrylated urethanes available under the trade designations "EBECRYL 270", "EBECRYL 1290", "EBECRYL 8301", and "EBECRYL 8804" from UCB Chemicals Corporation.

With respect to the useful polyacryl compounds presented above, it will be understood that the corresponding amides or thioesters are also useful. Preferably, the multifunctional ethylenically unsaturated ester of acrylic acid is a nonpolyethereal multifunctional ethylenically unsaturated ester of acrylic acid.

The multifunctional ethylenically unsaturated monomer is preferably an ester of acrylic acid. It is more preferably selected from the group consisting of a difunctional ethylenically unsaturated ester of acrylic, a trifunctional ethylenically unsaturated ester of acrylic, a tetrafunctional ethylenically unsaturated ester of acrylic, and a combination thereof. Of these, difunctional and trifunctional ethylenically unsaturated esters of acrylic acid are more preferred.

Preferred multifunctional ethylenically unsaturated esters of acrylic acid and can be described by the formula:

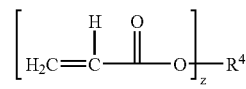

(IV)

wherein $R^4$ is a polyvalent organic group, which can be cyclic, branched, or linear, aliphatic, aromatic, or heterocyclic, having carbon, hydrogen, nitrogen, nonperoxidic oxygen, sulfur, or phosphorus atoms. $R^4$ may have a molecular weight of greater than 14, and up to 1000;

z is an integer designating the number of acrylic groups in the ester and z has a value of 2-6 (more preferably a has a value of 2-5, most preferably 2, or where a mixture of polyacrylates are used, z has an average value of about 2).

Examples of suitable multifunctional ethylenically unsaturated esters of acrylic acid are the polyacrylic acid or polymethacrylic acid esters of polyhydric alcohols including, for example, the diacrylic acid and dimethylacrylic acid ester of aliphatic diols such as ethyleneglycol, triethyleneglycol, 2,2-dimethyl-1,3-propanediol, 1,3-cyclopentanediol, 1-ethoxy-2,3-propanediol, 2-methyl-2,4-pentanediol, 1,4-cyclohexanediol, 1,6-hexamethylenediol, 1,2-cyclohexanediol, 1,6-cyclohexanedimethanol; the triacrylic acid acid esters of aliphatic triols such as glycerin, 1,2,3-propanetrimethanol, 1,2,4-butanetriol, 1,2,5pentanetriol, 1,3,6-hexanetriol, and 1,5,10-decanetriol; the triacrylic acid acid esters of tris(hydroxyethyl) isocyanurate; the tetraacrylic acid esters of aliphatic triols, such as 1,2,3,4-butanetetrol, 1,1,2,2-tetramethylolethane, 1,1,3,3-tetramethylolpropane, and pentaerythritol tetraacrylate; the pentaacrylic acid and pentamethacrylic acid esters of aliphatic pentols such as adonitol; the hexaacrylic acid acid esters of hexanols such as sorbitol and dipentaerythritol; the di acrylic acid acid esters of aromatic diols such as resorcinol, pyrocatechol, bisphenol A, and bis(2-hydroxyethyl) phthalate; the triacrylic acid ester of aromatic triols such as pyrogallol, phloroglucinol, and 2-phenyl-2,2-methylolethanol; and the hexaacrylic acid esters of dihydroxy ethyl hydantoin; and mixtures thereof.

There is a differential reactivity between acryl and methacryl groups with respect to Michael-type addition. Michael-type addition typically occurs easily with acryl groups (e.g., mere combination of a reactive fluorinated polyether with a compound having an acryl group, optionally with mild heating, typically, although not necessarily, results in spontaneous Michael-type addition), but may occur only with difficulty if at all, in the case of methacryl groups. For this reason, the polyacryl component typically has at least two acryl group (e.g., as part of acryloxy or acrylamido functionality), although the poly(meth)acryl compound may also have additional (meth)acryl groups (e.g., as part of methacrylate or methacrylamido functionality). Advantageously, composition may be prepared in which Michael addition occurs through the acryl groups, leaving methacyl groups unreacted. Such unreacted methacryl groups may be subsequently free-radically polymerized.

The functional monomers provide two benefits to the polymers prepared from the curable composition: control of molecular weight and incorporation of a functional group on the terminus of the polymer. Heretofore, the molecular weights of polymers derived from acetoacetates and diacrylates, were controlled by the stoichiometry of one of the components.

Useful azlactone functional monomers may be represented by the formulas:

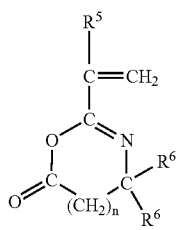

VII or ring-opened azlactone monomers of the formula

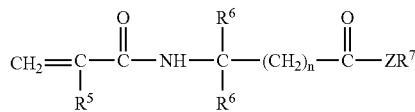

VIII where
R$^5$ is H or a C$_1$ to C$_3$ alkyl group, preferably H or a methyl group;
each R$^6$ is independently H, an alkyl group having 1 to 14 carbon atoms, a cycloalkyl group having 3 to 14 carbon atoms, an aryl group having 5 to 12 ring atoms, an arenyl group having 6 to 26 carbon and 0 to 3 S, N, and nonperoxidic Q heteroatoms, or R$^2$ and R$^3$ taken together with the carbon to which they are attached form a carbocyclic ring containing 4 to 12 ring atoms;
n is 0 or 1; and
R$^7$ is an organic or inorganic moiety and is the residue of a mono- or polyfunctional compound of the formula R$^7$-ZH;

Representative azlactone group-substituted functional monomers include 2-ethenyl-1,3-oxazolin-5-one; 2-ethenyl-4-methyl-1,3-oxazolin-5-one; 2-isopropenyl-1,3-oxazolin-5-one; 2-isopropenyl-4-methyl-1,3-oxazolin-5-one; 2-ethenyl-4,4-dimethyl-1,3-oxazolin-5-one; 2-isopropenyl-4,4-dimethyl-1,3-oxazolin-5-one; 2-ethenyl-4-methyl-4-ethyl-1,3-oxazolin-5-one; 2-isopropenyl-3-oxa-1-aza[4.5]spirodec-1-ene-4-one; 2-ethenyl-5,6-dihydro-4H-1,3-oxazin-6-one; 2-ethenyl-4,5,6,7-tetrahydro-1,3-oxazepin-7-one; 2-isopropenyl-5,6-dihydro-5,5-di(2-methylphenyl)-4H-1,3-oxazin-6-one; 2-acryloyloxy-1,3-oxazolin-5-one; 2-(2-acryloyloxy)ethyl-4,4-dimethyl-1,3-oxazolin-5-one; 2-ethenyl-4,5-dihydro-6H-1,3-oxazin-6-one, and 2-ethenyl-4,5-dihydro-4,4-dimethyl-6H-1,3-oxazin-6-one.

Representative oxazolinyl group-substituted functional monomers include 2-vinyl-2-oxazoline, 2-isopropenyl-2-oxazoline, 2-(5-hexenyl)-2-oxazoline, 2-acryloxy-2-oxazoline, 2-(4-acryloxyphenyl)-2-oxazoline, and 2-methacryloxy-2-oxazoline.

Ring-opened azlactone compounds of Formula VIII may be made by nucleophilic addition of a compound of the formula R$^7$-ZH to the azlactone carbonyl of Formula VII as shown below. In the Scheme II, R$^7$ is an inorganic or organic group having a nucleophilic -ZH group, which are capable of reacting with the azlactone moiety of Formula I. R$^7$-ZH may be water.

Scheme II

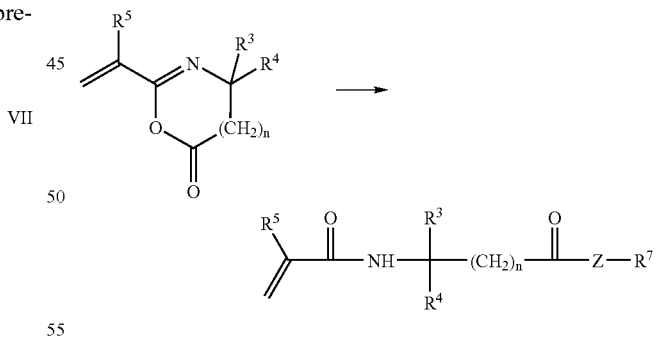

If organic, R$^7$ may be a polymeric or non-polymeric organic group that has a valence of m and is the residue of a nucleophilic group-substituted compound, R$^7$-ZH in which Z is —O—, —S—, or —NR$^8$ wherein R$^8$ can be a H, an alkyl, a cycloalkyl or aryl, a heterocyclic group, an arenyl. The organic moiety R$^7$ is preferably selected from mono- and polyvalent hydrocarbyl (i.e., aliphatic and aryl compounds having 1 to 30 carbon atoms and optionally zero to four heteroatoms of oxygen, nitrogen or sulfur), polyolefin, polyoxyalkylene, polyester, polyolefin, poly(meth)acrylate, or polysiloxane backbones. If inorganic, $R^7$ may comprise silica, alumina or glass having one or a plurality of -ZH groups on the surface.

In one embodiment, $R^7$ comprises a non-polymeric aliphatic, cycloaliphatic, aromatic or alkyl-substituted aromatic moiety having from 1 to 30 carbon atoms. In another embodiment, $R^7$ comprises a polyoxyalkylene, polyester, polyolefin, poly(meth)acrylate, polystyrene or polysiloxane polymer having pendent or terminal reactive -ZH groups. Useful polymers include, for example, hydroxyl, thiol or amino terminated polyethylenes or polypropylenes, hydroxyl, thiol or amino terminated poly(alkylene oxides) and poly(meth)acylates having pendant reactive functional groups, such as hydroxyethyl methacrylate polymers and copolymers.

Depending on the nature of the functional group(s) of $R^7$-ZH, a catalyst may be added to effect the condensation reaction. Normally, primary amine groups do not require catalysts to achieve an effective rate. Acid catalysts such as trifluoroacetic, ethanesulfonic, and toluenesulfonic acids are effective with hydroxyl groups and secondary amines. Basic catalysts such as DBU (1,8-diazabicyclo[5.4.0]undec-7-ene) and DBN (1,5-diazabicyclo[4.3.0]non-5-ene) are also effective.

Useful alcohols of the formula $R^7$-ZH include aliphatic and aromatic monoalcohols and polyols. Useful monoalcohols include methanol, ethanol, octanol, decanol, hydroxyethyl methacrylate and phenol.

Useful amines of the formula $R^7$-ZH include aliphatic and aromatic monoamines. Any primary or secondary amine may be employed, although primary amines are preferred to secondary amines. Useful monoamines include, for example, methyl-, ethyl-, propyl-, hexyl-, octyl-, dodecyl-, dimethyl-, methyl ethyl-, and aniline.

Useful thiols of the formula $R^7$-ZH include aliphatic and aromatic monothiols. Useful alkyl thiols include methyl, ethyl and butyl thiol, as well as 2-mercaptoethanol, 3-mercapto-1,2-propanediol, 4-mercaptobutanol, mercaptoundecanol, 2-mercaptoethylamine, 2,3-dimercaptopropanol, 3-mercaptopropyltrimethoxysilane, 2-chloroethanethiol, 2-amino-3-mercaptopropionic acid, dodecyl mercaptan, thiophenol, 2-mercaptoethyl ether, and pentaerythritol tetrathioglycolate. Useful soluble, high molecular weight thiols includes compounds such as the adduct of 2-mercaptoethylamine and caprolactam.

In another embodiment, the compound $R^7$-ZH may comprise a solid support having a plurality of -Z-H moieties on the surface thereof. Such functionalized supports have the general structure:

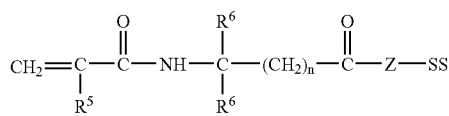

IX wherein Y—S, $R^5$, $R^6$, Z, and n are as previously described for Formula II and SS is a solid support corresponding to $R^7$ having a plurality of nucleophilic -Z-H groups on the surface thereof. The solid support material includes functional groups to which molecules of Formula IX can be covalently attached for building telechelic polymers on the surface. Useful functional groups include hydroxyl, amino and thiol functional groups corresponding to -ZH.

The support material can be organic or inorganic. It can be in the form of solids, gels, glasses, etc. It can be in the form of a plurality of particles (e.g., beads, pellets, or microspheres), fibers, a membrane (e.g., sheet or film), a disc, a ring, a tube, or a rod, for example. Preferably, it is in the form of a plurality of particles or a membrane. It can be swellable or non-swellable and porous or nonporous.

The support material can be a polymeric material that can be used in conventional solid phase synthesis. It is chosen such that it is generally insoluble in the solvents or other components used in synthetic reactions that occur during the course of solid phase synthesis. The support material can be a soluble or insoluble polymer having a molecular weight of 10,000 up to infinity for crosslinking polymers.

Examples of useable pre-existing support materials are described in G. B. Fields et al., *Int. J. Peptide Protein Res.,* 35, 161 (1990) and G. B. Fields et al., in *Synthetic Peptides: A User's Guide*, G. A. Grant, Ed., pages 77-183, W.H. Freeman and Co., New York, N.Y. (1992). The support material is in the form of an organic polymeric material, such as polystyrenes, polyalkylenes, nylons, polysulfones, polyacrylates, polycarbonates, polyesters, polyimides, polyurethanes, etc. and having hydroxyl, amino or thiol substituents on the surface. For pre-existing support materials, a preferred support material is polystyrene.

A suitable catalyst for the Michael reaction is a base of which the conjugated acid preferably has a pKa between 12 and 14. Most preferably used bases are organic. Examples of such bases are 1,4-dihydropyridines, methyl diphenylphosphane, methyl di-p-tolylphosphane, 2-allyl-N-alkyl imidazolines, tetra-t-butylammonium hydroxide, DBU (1,8-diazabicyclo[5.4.0]undec-7-ene) and DBN (1,5-diazabicyclo[4.3.0]non-5-ene), potassium methoxide, sodium methoxide, sodium hydroxide, and the like. A highly preferred catalyst in connection with this invention are DBU and tetramethylguanidine. The amount of catalyst used in a curable composition in accordance with the present invention is preferably between 0.05% by weight and 2% by weight more preferably between 0.1% by weight and 0.6% by weight.

Preferably, a curable composition in connection with the present invention is prepared by mixing two parts together. One part contains the catalyst and the other contains the reactants, i.e. the polyacryl component, the Michael donor component, and the monomer having a reactive functional group. Although it is also possible to have the catalyst together with one of the reactants in one part and having the other reactant in the other part, these embodiments generally produce inferior results, presumably because reaction of the catalyst with the reactant can take place. The extent of this reaction will generally depend on the kind of catalyst and reactants used.

The stoichiometry of the reactants is based not on molar amounts of the components, but molar functional group equivalents. For example, a compound of formula I such as methylacetoacetate has two protons alpha to both of the carbonyl groups, and so can react with two acryl groups. Thus methylacetoacetate has two functional group equivalents. In general, the ratio of Michael donor functional group equivalents ("donor equivalents") to Michael acceptor functional group equivalents ("acceptor equivalents") is less than 2:1, more preferably less than 1.5:1 and most preferably less than 1.1:1.

The amount of unsaturated monomer having an azlactone (or ring-opened azlactone) reactive functional group is generally less than or equal to the difference between the amount of Michael donor functional group equivalents to Michael acceptor functional group equivalents. Most preferably, donor equivalents≧acceptor equivalents+azlactone monomer. For example where the ratio of donor equivalents to acceptor equivalents is less than 2:1,the amount of azlactone monomer is 2 equivalents or less. Where the ratio of donor equivalents to acceptor equivalents is less than 1.5:1, the amount of azlactone monomer is 1 equivalent or less. Where the ratio of donor equivalents to acceptor equivalents is less than 1.1:1, the amount of azlactone monomer is 0.2 equivalents or less.

The telechelic polymers produced may be represented by the formula: Az-[D-A]$_y$-D-Az, wherein Az is the residue of an azlactone (or ring-opened aziactone) monomer, D is the residue of a Michael donor component (such as represented by formulas I, II or III), A is the residue of a polyacryl component, and y is at least 1. It will be understood that the above formula represents the most simple case where each of the donor and acceptor components has two functional equivalents.

More complex structures where the donor or acceptor component have a functional equivalent of more than two may also be produced and are within the scope of the invention. For example, where the polyacryl component A is trivalent, the telechelic polymers include those of the formula:

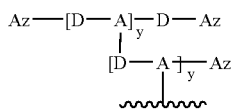

where D, A, y, and Az are as previously described.

Where D is trivalent, the telechelic polymers include those of the formula:

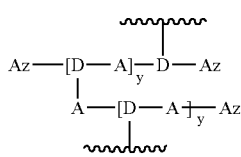

More particularly, the polymers produced may have the general structure

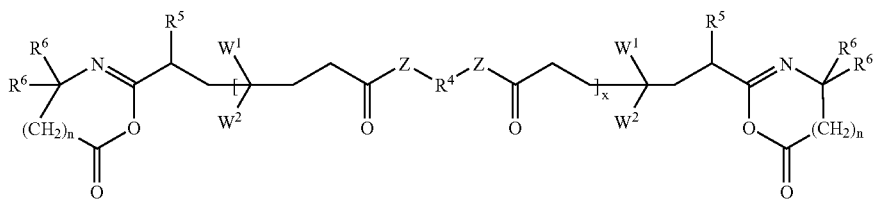

wherein
- $W^1$ and $W^2$ each independently selected from a cyano group, a nitro group, an alkyl carbonyl group, an alkoxy carbonyl group, an aryl carbonyl group, an aryloxy carbonyl group, an amido group, and a sulphonyl group;
- $R^4$ is a polyvalent organic group;
- $R^5$ is H or a $C_1$ to $C_3$ alkyl group;
- each $R^6$ is independently H, an alkyl group having 1 to 14 carbon atoms, a cycloalkyl group having 3 to 14 carbon atoms, an aryl group having 5 to 12 ring atoms, an arenyl group having 6 to 26 carbon and 0 to 3 S, N, and nonperoxidic O heteroatoms, or $R^2$ and $R^3$ taken together with the carbon to which they are attached form a carbocyclic ring containing 4 to 12 ring atoms;
- n is 0 or 1, and x is at least 1.

Curable compositions according to the present invention may be coated on a substrate and at least partially cured to provide a composite article. Suitable substrates include, for example, glass (e.g., windows and optical elements such as, for example, lenses and mirrors), ceramic (e.g., ceramic tile), cement, stone, painted surfaces (e.g., automobile body panels, boat surfaces), metal (e.g., architectural columns), paper (e.g., adhesive release liners), cardboard (e.g., food containers), thermosets, thermoplastics (e.g., polycarbonate, acrylics, polyolefins, polyurethanes, polyesters, polyamides, polyimides, phenolic resins, cellulose diacetate, cellulose triacetate, polystyrene, and styrene-acrylonitrile copolymers), and combinations thereof. The substrate may be a film, sheet, or it may have some other form.

The curable composition may be applied to the substrate by conventional techniques such as, for example, spraying, knife coating, notch coating, reverse roll coating, gravure coating, dip coating, bar coating, flood coating, or spin coating. Typically, the curable composition is applied to the substrate as a relatively thin layer resulting in a dried cured layer having a thickness in a range of from about 40 nm to about 60 nm, although thinner and thicker (e.g., having a thickness up to 100 micrometers or more) layers may also be used. Next, any optional solvent is typically at least partially removed (e.g., using a forced air oven), and the polymerizable composition is then at least partially polymerized (i.e., cured) to form a durable coating, for example, as described hereinabove.

EXAMPLES

These examples are merely for illustrative purposes only and are not meant to be limiting on the scope of the appended claims. All parts, percentages, ratios, etc. in the examples and the rest of the specification are by weight, unless noted otherwise. Solvents and other reagents used were obtained from Aldrich Chemical Company; Milwaukee, Wis. unless otherwise noted.

| Table of Abbreviations | |
|---|---|
| Abbreviation or Trade Designation | Description |
| HDDA | 1,6-hexanediol diacrylate |
| DBU | 1,8-diazabicyclo[5.4.0]undec-7-ene |
| 2-EHA AcAc | 3-Oxo-butyric acid 2-ethyl-hexyl ester |
| Methacrylate AcAc | 3-Oxo-butyric acid ethyl methacrylate ester |
| VDM | 2-vinyl-4,4-dimethyl azlactone commercially available from SNPE, Tolouse, France |

Examples 1-6

Synthesis of Multimethacrylate Functional Telechelic Oligomers

Reaction mixtures containing the reagents shown in Table 1 were placed in glass reaction vessels, sealed, and placed in a water shaker bath at 60° C. for 17 hours. The compositions and molecular weights as determined by gel permeation chromatography of the oligomers synthesized are shown in Table 1. Each of the azlactone terminated telechelic polymers may be converted to a ring-opened azlactone terminated telechelic polymer by the methods described herein.

TABLE 1

| Example | Methacrylate AcAc (grams) | HDDA (grams) | VDM (grams) | DBU (grams) | Di/Mono acrylate ratio | Mw × 10³ | Mn × 10³ |
|---|---|---|---|---|---|---|---|
| 1 | 2.5 | 2.64 |  | 0.025 |  | 72.1 | 4.7 |
| 2 | 2.5 | 2.38 | 0.17 | 0.025 | 90/10 | 20.9 | 3.4 |
| 3 | 2.5 | 2.11 | 0.32 | 0.025 | 80/20 | 7.6 | 2.2 |
| 4 | 2.5 | 1.85 | 0.49 | 0.025 | 70/30 | 1.3 | 0.8 |
| 5 | 2.5 | 1.59 | 0.65 | 0.025 | 60/40 | 1.3 | 0.7 |
| 6 | 2.5 | 1.32 | 0.81 | 0.025 | 50/50 | 1.4 | 0.8 |

What is claimed is:

1. A curable composition comprising:
   a) a Michael donor component
   b) a polyacryl Michael acceptor component, and
   c) an ethylenically unsaturated monomer having a ring-opened azlactone functional group, wherein said composition is curable by Michael addition between the Michael donor component, and the Michael acceptor component and the ethylenical ly unsaturated monomer having a ring-opened azlactone functional group.

2. The composition of claim 1 wherein said Michael donor component corresponds to one of formulas (I) to (III):

$(W^1-CHR^1-C(O))_x-P$     (I)

$(W^1-NH-C(O))_x-P$     (II)

$W^1-CH_2-W^2$     (III)

wherein
   $R^1$ represents hydrogen, an alkyl group or an aryl group;
   $W^1$ and $W^2$ each independently selected from a cyano group, a nitro group, an alkyl carbonyl group, an alkoxy carbonyl group, an aryl carbonyl group, an aryloxy carbonyl group, an amido group, and a sulphonyl group;
   P represents a mono- or multi-valent organic residue, or the reaction residue of a polyol or polyamine in an acetoacetylation reaction, and
   x is an integer of 1 or more, with the proviso that the number of donor equivalents is two or greater.

3. The composition of claim 2 wherein said Michael donor is of the formula:

$R^2-CO-CH_2-CO-R^3$;

wherein $R^2$ and $R^3$; are independently selected from a substituted or an unsubstituted alkyl, an unsubstituted or substituted aryl, a substituted or unsubstituted alkoxy group or a substituted or unsubstituted aryloxy group.

4. The composition of claim 3 selected from acetylacetone, methylacetoacetate, ethylacetoacetate, methyl malonate, ethyl malonate, or t-butyl acetoacetate.

5. The composition of claim 3, wherein one of $R^2$ and $R^3$ are further substituted by an ethylenically unsaturated polymerizable group.

6. The composition of claim 1, wherein said polyacryl component is of the formula:

$R^4\text{-}(Z\text{-}C(=O)-CH=CH_2)_z$ wherein each Z independently represents —S—, —O—, —NH—, or —NR⁵—, where $R^5$ represents H, or an alkyl group having from 1 to 6 carbon atoms;
   $R^4$ independently represents a polyvalent organic group having a valence of z.

7. The composition of claim 6 wherein $R^4$ is the residue of a polyol.

8. The composition of claim 1 wherein said ethylenically unsaturated monomer having a ring-opened azlactone functional group is of the formula:

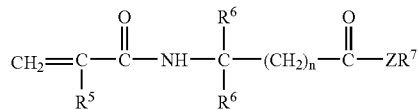

where
$R^5$ is H or a $C_1$ to $C_3$ alkyl group;
each $R^6$ is independently H, an alkyl group, a cycloalkyl group, an aryl group, an arenyl group, or the geminal $R^6$ groups form a carbocyclic ring;
n is 0 or 1; and
$R^7$-Z- is the residue of a monofunctional compound of the formula $R^7$-ZH, wherein $R^7$ is a polymeric or non-polymeric organic group and in which Z is —O—, —S—, or —NR⁸ wherein $R^8$ is a H, an alkyl, a cycloalkyl or aryl, a heterocyclic group, or an arenyl group.

9. The composition of claim 1 wherein the ratio of donor equivalents to acceptor equivalents is less than 2:1.

10. The composition of claim 1 wherein the ratio of donor equivalents to acceptor equivalents is less than 1.5:1.

11. The composition of claim 1 wherein the ratio of donor equivalents to acceptor equivalents is less than 1.1:1.

12. The composition of claim 10 wherein the molar amount of donor equivalents≧acceptor equivalents+azlactone monomer.

* * * * *

UNITED STATES PATENT AND TRADEMARK OFFICE
CERTIFICATE OF CORRECTION

PATENT NO. : 7,332,546 B2
APPLICATION NO. : 10/956841
DATED : February 19, 2008
INVENTOR(S) : Duane D. Fansler It is certified that error appears in the above-identified patent and that said Letters Patent is hereby corrected as shown below:

Column 2,
Line 50, delete ""lacryl"" and insert -- "acryl" --, therefor.

Column 8,
Line 8, delete "Q" and insert -- O --, therefor.

Line 27, delete "- 6H -" and insert -- - 6$\underline{H}$ - --, therefor.

Column 10,
Line 59, delete "aziactone" and insert -- azlactone --, therefor.

Column 11,
Line 7, delete "aziactone)" and insert -- azlactone) --, therefor.

Signed and Sealed this

Second Day of December, 2008

JON W. DUDAS
*Director of the United States Patent and Trademark Office*